(12) United States Patent
Van Den Brand et al.

(10) Patent No.: US 8,980,025 B2
(45) Date of Patent: Mar. 17, 2015

(54) METHOD AND APPARATUS FOR LAMINATING A FIRST AND A SECOND SHEET

(75) Inventors: Jeroen Van Den Brand, Goirle (NL);
Sander Christiaan Broers, Weert (NL);
Milan Saalmink, Veldhoven (NL);
Andreas Heinrich Dietzel,
Braunschweig (DE); Andreas Tanda,
Linz (AT)

(73) Assignee: Nederlandse Organisatie Voor Toegepast-Natuurwetenschappelijk Onderzoek Tno, Delft (NL)

( * ) Notice: Subject to any disclaimer, the term of this patent is extended or adjusted under 35 U.S.C. 154(b) by 67 days.

(21) Appl. No.: 13/511,472

(22) PCT Filed: Nov. 1, 2010

(86) PCT No.: PCT/NL2010/050728
§ 371 (c)(1),
(2), (4) Date: Sep. 5, 2012

(87) PCT Pub. No.: WO2011/065817
PCT Pub. Date: Jun. 3, 2011

(65) Prior Publication Data
US 2013/0000816 A1    Jan. 3, 2013

(30) Foreign Application Priority Data

Nov. 27, 2009    (EP) .................................... 09177379

(51) Int. Cl.
*B32B 41/00*    (2006.01)
*B32B 37/00*    (2006.01)
*B32B 37/10*    (2006.01)
*B32B 38/18*    (2006.01)

(52) U.S. Cl.
CPC ............. *B32B 37/0046* (2013.01); *B32B 37/10* (2013.01); *B32B 37/1009* (2013.01); *B32B 38/1841* (2013.01); *B32B 2309/68* (2013.01)

USPC ............ 156/64; 156/212; 156/285; 156/350;
156/351; 156/361; 156/362; 156/363; 156/364;
156/378; 156/379; 156/382; 156/513; 156/519;
156/520; 156/552; 156/583.3

(58) Field of Classification Search
USPC ........... 156/64, 212, 285, 350, 351, 361, 362,
156/363, 364, 378, 379, 382, 513, 5, 19,
156/520, 552, 583.3
See application file for complete search history.

(56) References Cited

U.S. PATENT DOCUMENTS

| | | |
|---|---|---|
| 4,360,266 A | 11/1982 | Takeuchi |
| 5,788,802 A | 8/1998 | Raney |
| 6,113,724 A | 9/2000 | Ogawa |
| 2004/0095546 A1 | 5/2004 | Lee et al. |
| 2004/0095548 A1 | 5/2004 | Lim et al. |
| 2004/0114095 A1 | 6/2004 | Lee et al. |

FOREIGN PATENT DOCUMENTS

| | | |
|---|---|---|
| CN | 101249739 | 8/2008 |
| JP | S63-276542 | 11/1988 |
| JP | H10-260410 | 9/1998 |
| JP | 2005-246773 | 9/2005 |
| JP | 2008-110492 | 5/2008 |
| WO | WO-2009/060890 | 5/2009 |

OTHER PUBLICATIONS

International Search Report for PCT/NL2010/050728, mailed Feb. 17, 2011, 3 pages.
Optek DPL-24 Users Guide, Operations Technology, Inc. (2004), retrieved from the Internet: http://www.optek.net/PDF_files/file_PDF_DPL24_manual.pdf>, retrieved on May 5, 2010.
Office Action in Japanese Patent Application No. JP-2012-541041, mailed Oct. 7, 2014, 5 pages (English translation included).

*Primary Examiner* — Jeff Aftergut
*Assistant Examiner* — Joshel Rivera
(74) *Attorney, Agent, or Firm* — Morrison & Foerster LLP

(57) ABSTRACT

An apparatus is provided for laminating a first and a second sheet (1, 2) comprising—a chamber (10) having a first, a second and a third compartment (11, 12, 13 resp.) subsequently arranged along a first axis (Z), each compartment having a port (21, 22, 23 resp.)—a first sheet carrier (40) arranged transverse to said first axis (Z) and being displaceable along said first axis (Z),—a second sheet carrier (50) arranged in a plane aligned with and opposite the first sheet carrier (40), the second sheet carrier being displaceable and/or rotatable in said plane,—a first flexible membrane (42) extending laterally to a wall of the chamber, the first sheet carrier (40) and/or the first flexible membrane (42) separating the first and the second compartment (11, 12) of the chamber (10) from each other,—a second flexible membrane (52) extending laterally from the second sheet carrier (50) to the wall of the chamber, the second sheet carrier (50) and the second flexible membrane (52) separating the second and the third compartment (12, 13) of the chamber (10) from each other,—an alignment facility (60) for aligning the second sheet (2) relative to the first sheet (1) by moving the second sheet carrier (50) in a direction transverse to the first axis (Z) and/or rotating the second sheet carrier around an axis parallel to the first axis (Z).

15 Claims, 8 Drawing Sheets

METHOD AND APPARATUS FOR LAMINATING A FIRST AND A SECOND SHEET

CROSS-REFERENCE TO RELATED APPLICATIONS

This application is the national phase of PCT application PCT/NL2010/050728 having an international filing date of 1 Nov. 2010, which claims benefit of European patent application No. 09177379.6 filed 27 Nov. 2009. The contents of the above patent applications are incorporated by reference herein in their entirety.

BACKGROUND OF THE INVENTION

1. Field of the invention

The present invention relates to an apparatus for laminating a first and a second sheet.

The present invention further relates to a method for laminating a first and a second sheet.

2. Related Art

Various products are fabricated by sequential addition of components to previously supplied components. An important application area is in the manufacturing of electronic components as a stack of sheets. For the purpose of this description a sheet is an artifact that is thin relative to its length and width, e.g. a sheet of glass or a polymer sheet. A sheet may comprise a plurality of layers. The electronic product comprises for example a first sheet having OLED functionality, a second sheet comprising printed photodiodes and a third sheet comprising driver electronics. Subsequent sheets in the stack have electronic functional areas that in contact with each other perform an electronic function. In the manufacture of such electronic components it is important that mutually subsequent sheets are accurately positioned with respect to each other in order that electronic, optic or fluidic features, such as microfluidic channels in a sheet accurately contact features to cooperate therewith in the subsequent sheet.

The OPTEK DPL-24 user's guide describes a differential pressure laminator. The laminator described therein comprises a vessel having a top and a bottom section that are separated by a flexible diaphragm of silicone rubber. Each of the sections has a respective port and a respective heater. The materials to be laminated are applied on a drawer platen that is arranged in the bottom section. In a first stage of a lamination cycle air at atmospheric pressure is present in the bottom section of the vessel, pushing the diaphragm upwards, above and separate from the materials to be laminated. In a subsequent stage of the lamination cycle, both sections are evacuated via their respective port. In this stage the diaphragm still is separate from the materials to be laminated. Air is allowed to escape from between the materials to be laminated.

In a subsequent stage of the lamination cycle, pressure is applied to the port of the top-section of the vessel so that the preheated diaphragm starts to apply an isostatic pressure against the materials to be laminated.

At the end stage of the lamination cycle the port of the top-section is connected to the vacuum pump and the port of the bottom-section is vented to atmospheric pressure, so that the diaphragm releases the laminated materials and the drawer with the laminated materials can be removed from the vessel.

SUMMARY OF THE INVENTION

It is an aim of the present invention to provide an improved apparatus and an improved method for laminating a first and a second sheet.

According to a first aspect of the invention an apparatus is provided for laminating a first and a second sheet. The apparatus comprises a chamber having a first, a second and a third compartment subsequently arranged along a first axis, each compartment having a port a first sheet carrier arranged transverse to said first axis and being displaceable along said first axis, a second sheet carrier arranged in a plane aligned with and opposite the first sheet carrier, the second sheet carrier being displaceable and/or rotatable in said plane, a first flexible membrane extending laterally to a wall of the chamber, the first sheet carrier and/or the first flexible membrane separating the first and the second compartment of the chamber from each other, a second flexible membrane extending laterally from the second sheet carrier to the wall of the chamber, the second sheet carrier and the second flexible membrane separating the second and the third compartment of the chamber from each other, an alignment facility for aligning the second sheet relative to the first sheet by moving the second sheet carrier in a direction transverse to the first axis and/or rotating the second sheet carrier around an axis parallel to the first axis, the apparatus having a first main operational mode wherein the ratio of the pressure inside the first compartment over the pressure inside the second compartment is relatively low and a second main operational mode wherein the ratio of the pressure inside the first compartment over the pressure inside the second compartment and the ratio of the pressure inside the third compartment over the pressure inside the second compartment are relatively high.

In the apparatus according to the first aspect of the invention the alignment facility allows movements and/or rotations of the second sheet carrier relative to the first sheet carrier so as to align the sheets, therewith allowing the proper features of mutually subsequent sheets to cooperate with each other. This requires that the second sheet carrier has additional degrees of freedom. The apparatus according to the invention is provided with an additional, third compartment that is defined by the second flexible membrane and that is provided with a relatively high pressure in the second main operational mode. Therewith it is avoided that deformations occur in the second sheet carrier.

The sheets are aligned in non-contact mode. This allows aligning of sheets having delicate components mounted or printed thereon. This also makes it possible to apply a self-sticking adhesive for adhering the sheets before alignment. Adhesives are not only useful for adherence of the sheets, but may also be used to form conductive paths. For this purpose for example anisotropically conductive adhesives may be used.

The apparatus is advantageous as compared to a lamination apparatus using rollers to laminate the sheets in that only a very limited stress is introduced into the sheets, as during the lamination substantially pressure is applied over the entire surface of the sheet simultaneously. Moreover, contrary to a roller-based lamination system the sheets are not deformed during the lamination process.

Deviations from the acquired alignment by the lamination process are avoided as the sheets are laminated by a movement transverse to their surfaces, contrary to a roller based lamination process, wherein the sheets also are transported longitudinally.

The apparatus allows both rigid and flexible substrates or a combination thereof to be laminated.

In a particular embodiment of the apparatus according to the first aspect of the invention the first flexible membrane is formed by the first sheet carrier.

In a variant of said embodiment the first flexible membrane is integral with the first sheet carrier. In other words the apparatus has a first flexible membrane that extends of the full cross-section of the chamber and that both serves as a first sheet carrier and as a flexible means to separate the first and the second compartment from each other.

Preferably in that variant the first flexible membrane has a central portion forming the first sheet carrier and a peripheral portion extending from the central portion to the wall of the chamber, the peripheral portion having a flexibility higher than that of the central portion.

In another variant of said particular embodiment the first sheet carrier has a first, rigid part and a second, flexible part formed by said flexible membrane, the second flexible part being arranged at a side of the first rigid part facing the second sheet carrier. In said other variant the second flexible part formed by the flexible membrane may be stretched over the first rigid part.

The rigid part of the first sheet carrier may have pores that extend along the first axis.

In an embodiment of the apparatus according to the first aspect of the invention the second compartment is evacuated in the second main operational mode and the apparatus has a first intermediary operational mode succeeding the first main operational mode and preceding the second main operational mode, wherein each of the compartments is evacuated. A direct transition from the first main operational mode to the second main operational mode could bring the first and the second sheet carrier into an engaged position before the second compartment is fully evacuated, unless for example resilient means are provided that counteract this. A transition of the sheet carriers to the engaged position before the second compartment is evacuated may result in enclosure of air bubbles between the sheets, which generally is undesirable. In the apparatus according to this embodiment the first intermediate operational mode allows air to escape from between the sheets before lamination.

A direct transition from the first main operational mode to the first intermediate operational mode is possible. In that case care should be taken that the pressure in the second compartment does not drop below the pressure in the first compartment during the transition. A particular version of the previously described embodiment of the apparatus has a second intermediary operational mode succeeding the first main operational mode and preceding the first intermediary operational mode wherein the first and the third compartment are evacuated and the second compartment maintains the pressure of the first main operational mode. In this version of the embodiment the occurrence of a too low pressure in the second compartment is avoided.

In a version of said embodiment having a first intermediary operation mode the alignment facility is activated in that first intermediary operational mode. This has the advantage that the time spent in the first intermediary operational mode for removing enclosed air between the sheets is used efficiently to allow the sheets to be aligned.

An embodiment of the apparatus according to the first aspect of the invention comprises a first and a second visual detection facility associated with a first and a second window, the first and the second window being arranged in at least one of the sheet carriers and wherein each of the visual detection facilities has a line of sight extending in a direction parallel with the first axis via its associated window in the sheet carrier wherein the window is arranged to the other one of the sheet carriers. In this way the alignment of the sheets with respect to each other can be accurately verified as each of the visual detection facilities can simultaneously monitor alignment marks in both of the sheets. Alternatively visual detection means could be arranged at side-wall of the apparatus. In this case however, separate visual detection means are necessary requiring a calibration of the system. Moreover, the visual detection will in practice be less accurate as the visual detection means have to be arranged at an angle with respect to the surface to be observed.

According to a second aspect of the invention a method is provided for laminating a first and a second sheet. The method comprises the steps of providing a chamber with a first, a second and a third compartment, subsequently arranged along a first axis, and a first and a second sheet carrier, wherein the first and the second sheet carrier have a respective first and second flexible membrane that extends laterally to a wall of the chamber, wherein the first sheet carrier and the first flexible membrane separates the first and the second compartment of the chamber from each other, and wherein the second sheet carrier and the second flexible membrane separates the second and the third compartment of the chamber from each other, and wherein the sheet carriers are aligned with each other and are arranged transverse to the first axis, applying the first sheet at a side of the first sheet carrier facing the second sheet carrier, applying the second sheet at a side of the second sheet carrier facing the first sheet carrier, maintaining a ratio of the pressure inside the first compartment over the pressure inside the second compartment at a relatively low value, detecting a relative position and/or orientation of the second sheet relative to the first sheet, aligning the second sheet relative to the first sheet by moving the second sheet carrier in a direction transverse to the first direction and/or rotating the second sheet carrier around an axis parallel to the first direction, maintaining a ratio of the pressure inside the first compartment over the pressure inside the second compartment and a ratio of the pressure inside the third compartment over the pressure inside the second compartment at a relatively high value as compared to said relatively low value.

By maintaining a ratio of the pressure inside the first compartment over the pressure inside the second compartment and a ratio of the pressure inside the third compartment over the pressure inside the second compartment at a relatively high value as compared to said relatively low value the sheet carriers are forced against each other so that the sheets are laminated. An optimal evacuation between the sheets is achieved if the pressure in the second compartment is lower than 0.1 bar during this phase of execution of the method.

In an embodiment all compartments are evacuated. In a stage wherein all three compartments are evacuated it is achieved that the sheet carriers remain at distance from each other, while the evacuated mode of the second compartment allows air bubbles to escape before they are trapped by lamination.

In an embodiment all compartments are evacuated in a first and a second sub-step. In the first sub-step the first and the third compartment are evacuated and in a second sub-step the second compartment is evacuated. This avoids at any point in time that the pressure inside the second compartment drops below the pressure in the neighboring first and third compartments and therewith avoids that lamination starts too early.

BRIEF DESCRIPTION OF THE DRAWINGS

These and other aspects are described in more detail with reference to the drawing. Therein:

FIG. 4A shows a first stage of the method, FIG. 4B shows a second stage of the method, FIG. 4C shows a third stage of the method, FIG. 4D shows a fourth stage of the method, FIG. 4E shows a fifth stage of the method, FIG. 4F shows a sixth stage of the method.

DETAILED DESCRIPTION OF EMBODIMENTS

Figure 1:
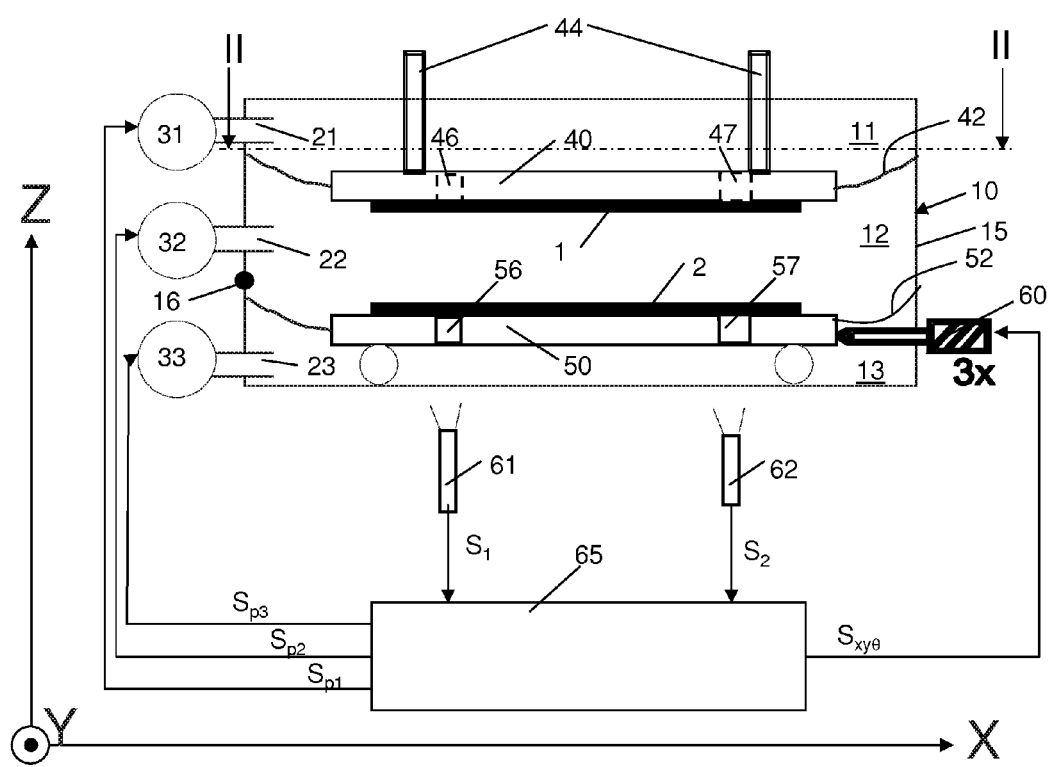
FIG. 1 shows an embodiment of an apparatus according to the first aspect of the invention.

In the following detailed description numerous specific details are set forth in order to provide a thorough understanding of the present invention. However, it will be understood by one skilled in the art that the present invention may be practiced without these specific details. In other instances, well known methods, procedures, and components have not been described in detail so as not to obscure aspects of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein. All publications, patent applications, patents, and other references mentioned herein are incorporated by reference in their entirety. In case of conflict, the present specification, including definitions, will control. In addition, the materials, methods, and examples are illustrative only and not intended to be limiting.

FIG. 1 schematically shows an apparatus for laminating a first and a second sheet 1, 2. The apparatus comprises a chamber 10 having a first, a second and a third compartment 11, 12, 13. In the second compartment the chamber 10 has a hinge 16 for opening the chamber 10 as is described further with reference to FIG. 3. The compartments 11, 12, 13 are subsequently arranged along a first axis Z, each compartment has a respective port 21, 22, 23. The ports 21, 22, 23 are coupled to a respective pressure controller 31, 32, 33. The pressure controllers control the pressures in the respective compartment in response to a respective pressure control signal $S_{p1}, S_{p2}, S_{p3}$. To that end the pressure controllers may for example comprise a pump for evacuating and a valve for allowing air to enter the compartments. Alternatively they may comprise an additional pump for providing an overpressure e.g. to compartments 11 and 13.

The apparatus further comprises a first and a second rigid and plane sheet carrier 40, 50. The sheet carriers may be constructed from a metal like stainless steel or aluminum, but alternatively they may be constructed from a polymer. In the embodiment shown the sheet carriers 40, 50 each have a size in the X,Y plane of 20×20 cm. This embodiment enables lamination of 6 inch sized sheets. However, the apparatus may be provided with sheet carriers of a different size, e.g. 10×10 cm or 100×100 cm. The first sheet carrier 40 is arranged transverse to said first axis Z and is displaceable in the direction of said first axis Z with guidance means 44. To that end the first sheet carrier 40 is coupled via a guidance mechanism that limits movements of the first sheet carrier 40 to movements in the Z-direction. The second sheet carrier 50 is arranged in a plane aligned with and opposite the first sheet carrier 40. The second sheet carrier 50 is displaceable and/or rotatable in said plane.

Figure 2:
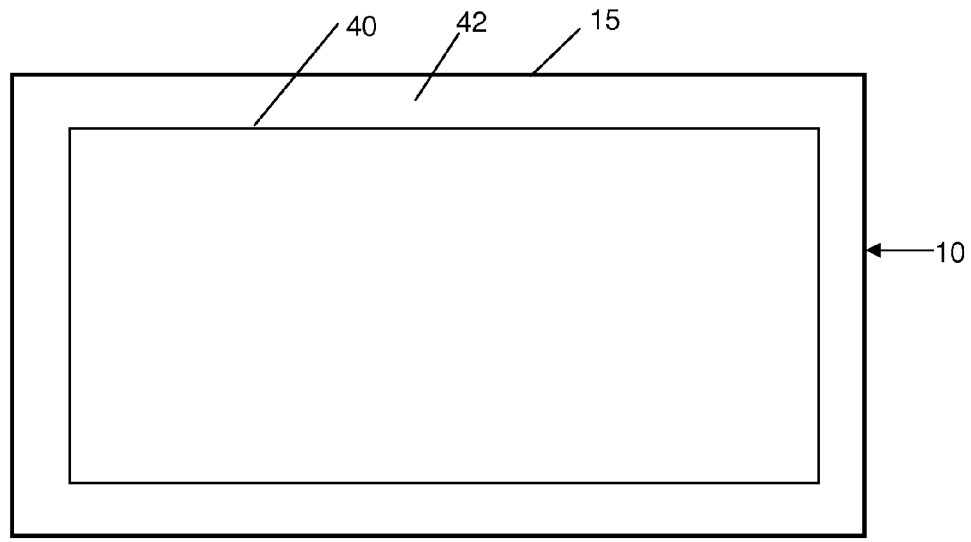
FIG. 2 shows a cross-section according to II-II in FIG. 1.

The apparatus further has a first flexible membrane 42 extending laterally from the first sheet carrier 40 to a wall of the chamber (See also FIG. 2, which is a cross-section according to II-II of FIG. 1). The first sheet carrier 40 and the first flexible membrane 42 separate the first and the second compartment 11, 12 of the chamber 10 from each other.

A second flexible membrane 52 extends laterally from the second sheet carrier 50 to the wall 15 of the chamber 10, in a way analogous as shown for the first flexible membrane. The second sheet carrier 50 and the second flexible membrane 52 separate the second and the third compartment 12, 13 of the chamber 10 from each other. In the embodiment shown the flexible membranes 42, 52 are formed by a rim having a width of 2 cm and a thickness of 1 mm of an elastic material, such as a vulcanized rubber, or a silicone rubber. Other materials and sizes may be applied provided that they provide for a sufficient elasticity and are sufficiently air-tight.

The apparatus has an alignment facility 60 controlled by a signal $Sx_{x,y,\theta}$ from controller 65 for aligning the second sheet 2 relative to the first sheet 1 by moving the second sheet carrier 50 in directions X,Y transverse to the first axis Z and/or rotating the second sheet carrier 50 around an axis parallel to the first axis Z. The controller 65 generates the signal $S_{x,y,\theta}$ on the basis of image signals $S_1, S_2$ obtained from camera's 61, 62 respectively. The controller 65 further provides the control signals to the $S_{p1}, S_{p2}, S_{p3}$ to the pressure controllers 31, 32, 33.

The pressure controllers realize in a first main operational mode of the apparatus that the ratio of the pressure inside the first compartment 11 over the pressure inside the second compartment 12 is relatively low and in a second main operational mode that the ratio of the pressure inside the first compartment 11 over the pressure inside the second compartment 12 and the ratio of the pressure inside the third compartment 13 over the pressure inside the second compartment 12 are relatively high.

In a typical embodiment the apparatus has a first main operational mode wherein each of the compartments 11, 12, 13 is at atmospheric pressure and a second main operational mode wherein the first and the third compartment 11, 13 are at atmospheric pressure and the second compartment 12 is evacuated. Accordingly in said first operational mode the ratio of the pressure inside the first compartment 11 over the pressure inside the second compartment 12 is about 1, and in this case also the ratio of the pressure inside the third compartment 13 over the pressure inside the second compartment 12 is about 1, while in the second operational mode the ratio of the pressure inside the first compartment 11 over the pressure inside the second compartment 12 and the ratio of the pressure inside the third compartment 13 over the pressure inside the second compartment 12 are relatively high, e.g. in the order of 10 or higher.

The camera's 61, 62 forming a first and a second detection facility are associated with a first and a second window 56, 57. Both windows are arranged in the second sheet carrier 50. Each of the visual detection facilities 61, 62 has a line of sight extending in a direction parallel with the first axis Z via its associated window 56, 57 in the sheet carrier 50 wherein the window 56, 57 is arranged to the other one 40 of the sheet carriers 40, 50.

In the embodiment shown also the first sheet carrier 40 is provided with a first and a second window 46, 47. In an embodiment light-sources may be arranged behind these windows 46, 47 to illuminate a location of the sheets 1 and 2 provided with alignment marks. It is not necessary that the visual detection means are camera's. Instead the visual detection means 61, 62 may simply detect an amount of light passing through its associated window 56, 57.

It is not necessary that the sheets 1, 2 are translucent. In case the sheets are opaque, alignment marks in the form of e.g. circular openings may be provided therein. The amount of light passing through the alignment marks of the first and the second sheet 1, 2 in the line of sight of the visual detection facility 61, 62 is indicative for the degree of alignment.

An embodiment of a method according to the second aspect is now described in more detail with respect to FIG. 3 and FIGS. 4A to 4F. In these Figures some details like the controller and the pressure controllers are omitted for more clarity.

Figure 3:
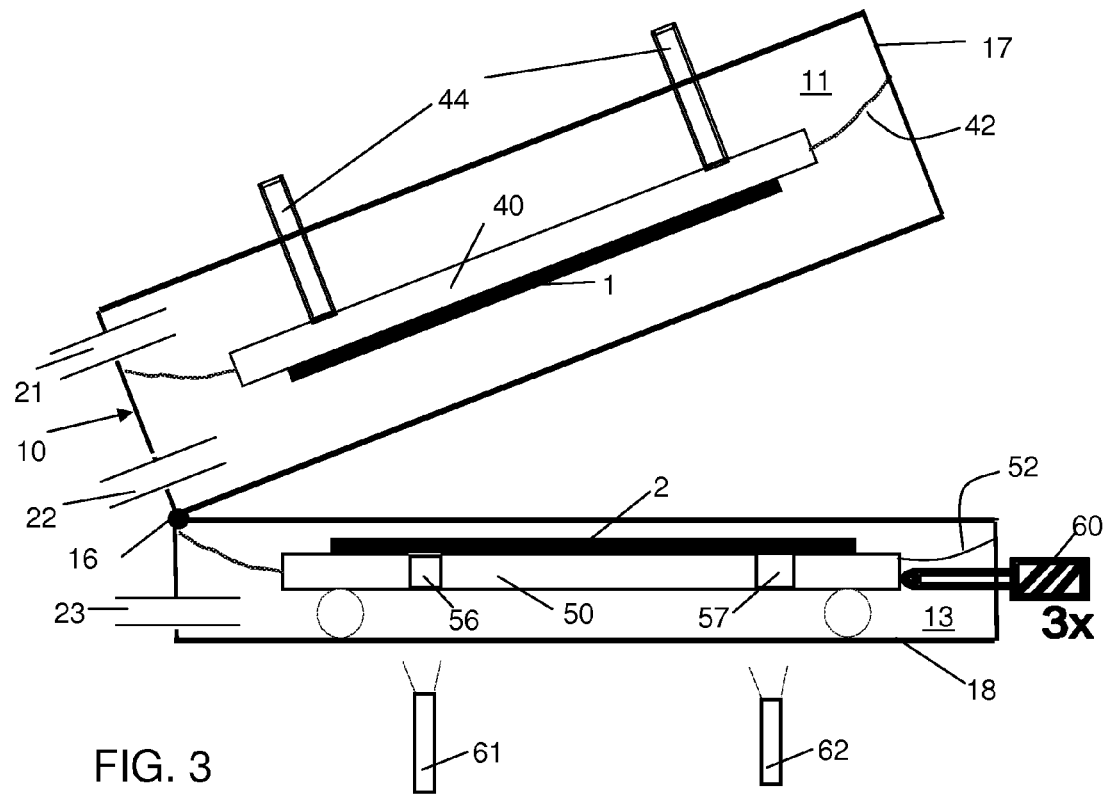
FIG. 3 shows a view of the apparatus of FIG. 1 in an opened mode.

FIG. 3 shows the apparatus in an opened mode. In this case the chamber has a housing with a first and a second part 17, 18 that are coupled to each other by a hinge 16. The first part 17 of the housing comprises the first sheet carrier 40 and the guidance means 44 therefore. The second part 18 of the housing comprises the second sheet carrier 50 and the alignment facility 60. In the opened mode the sheet carriers 40, 50 are accessible to apply a respective sheet thereon. To that end the sheet carriers 40, 50 may be provided at their surface with a layer of a self-sticking rubber such as PMDS, to hold the sheets. Alternatively the sheet carriers may have an inner space that communicates by pores with the surface for applying the sheets, and that is evacuated during use.

Figure 4A:
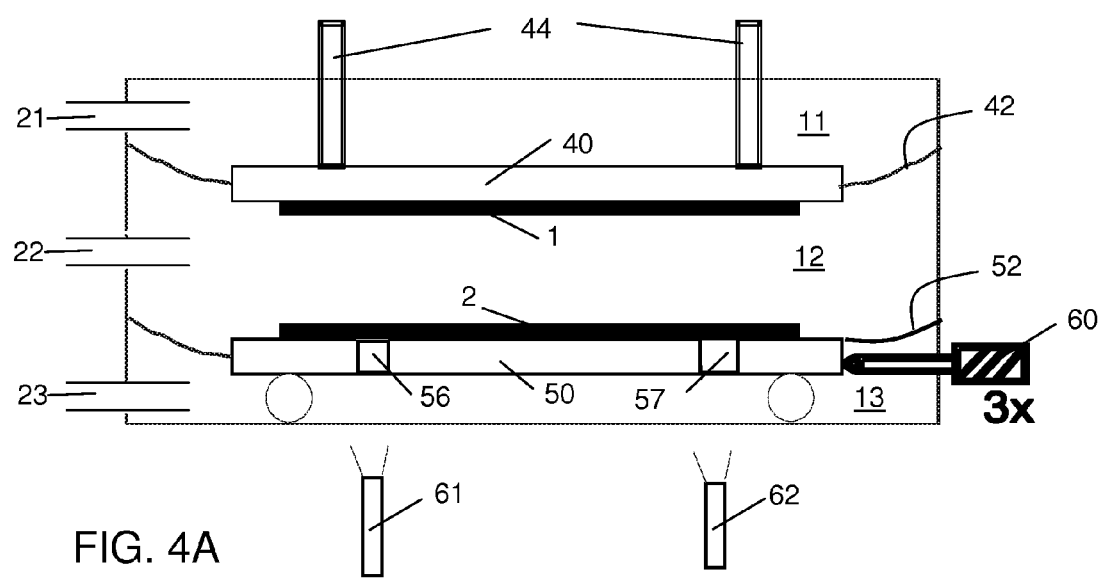
FIG. 4A to 4F illustrate a method according to the first aspect of the invention using the apparatus of FIG. 1, therein

FIG. 4A schematically shows the apparatus directly after the housing is closed. In this first operational mode of the apparatus the second compartment 12 is at an atmospheric pressure. The other compartments 11, 13 may also be at an atmospheric pressure.

Figure 4B:
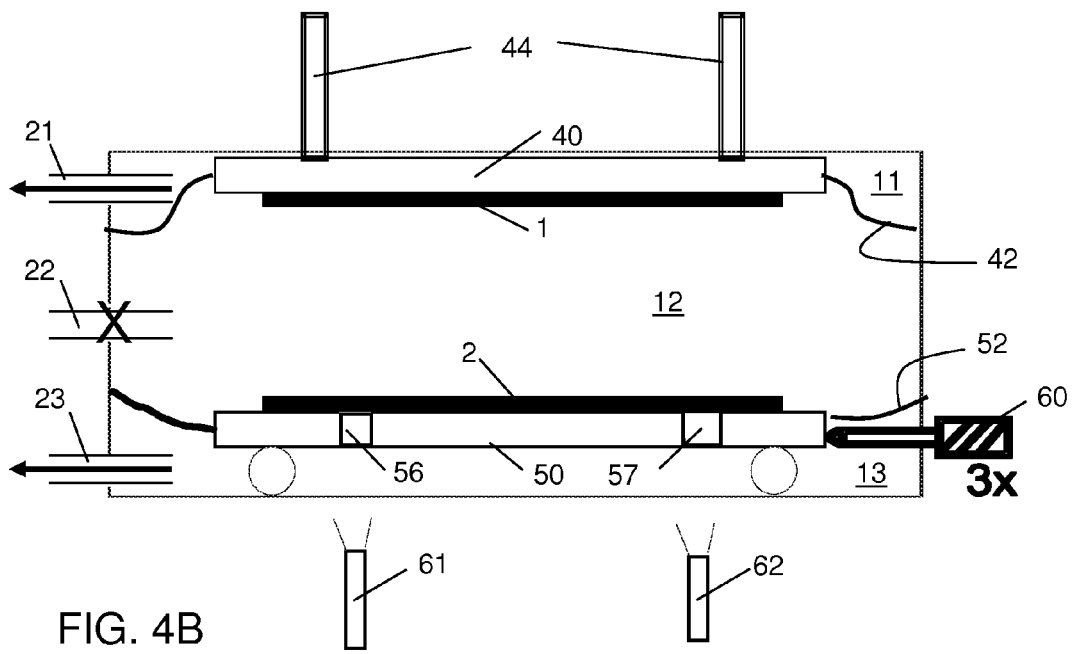

In a next step shown in FIG. 4B the first and the third compartment 12 are evacuated via ports 21 and 23 respectively. This forces the first sheet carrier 40 to move in a direction away from the second sheet carrier 50 against the top wall of the chamber 11. The second sheet carrier 50 is already supported by the bottom wall of the chamber and does not move.

Figure 4C:
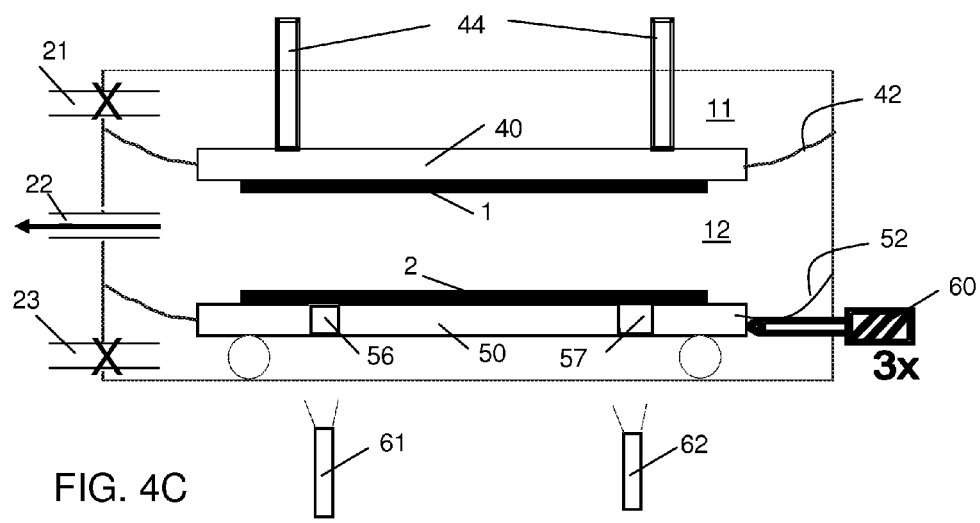

As shown schematically in FIG. 4C the second compartment 12 is subsequently evacuated via port 22. After this step each of the compartments 11, 12 and 13 is evacuated schematically shown in FIG. 4D. Now the relative position of the alignment marks in front of the visual detection facilities 61, 62 is determined. On the basis of this determination the second sheet 2 is aligned relative to the first sheet 1 by moving the second sheet carrier 50 in a direction transverse to the Z-axis and/or rotating the second sheet carrier 50 around an axis parallel to Z-axis. In this mode the first and the second sheet 1,2 are at a distance in the range of 0.5 to 2mm, for example in the order of 1 mm. At this distance it can be easily arranged that both sheets are within the dept of field of the visual detection facilities 61, 62, avoiding that extremely costly facilities are required for these visual detection facilities. It would alternatively be possible to carry out the alignment process while each of the chambers are under atmospheric pressure as shown in FIG. 4A. Also the alignment process may be carried out in the situation shown in FIG. 4B. However, this is less preferred as the difference in pressure between the second compartment 12 and the first and the third compartment 11, 13 may result in slight deformations of the sheet carriers, which could bias the alignment. Also the sheets 1,2 are further apart in the situation shown in 4B, which may result in a less accurate measurement of the relative position of the alignment marks of the sheets 1, 2.

Figure 4D:
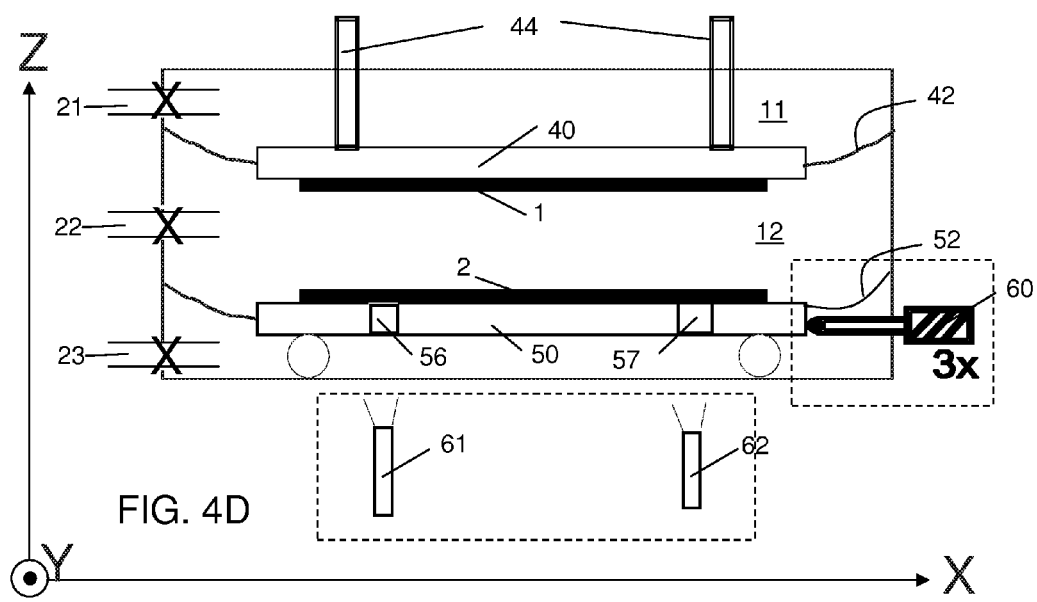

In the embodiment described above the operational mode described with reference to FIG. 4D is achieved via transition modes described with reference to FIG. 4B and 4C. It could alternatively be considered to directly transfer the apparatus from the mode of FIG. 4A to the mode of FIG. 4D by simultaneously evacuating each of the compartments. In that case care should be taken that the pressure in the second compartment 12 does not drop more rapidly than the pressure in the compartments 11, 13.

Figure 4E:
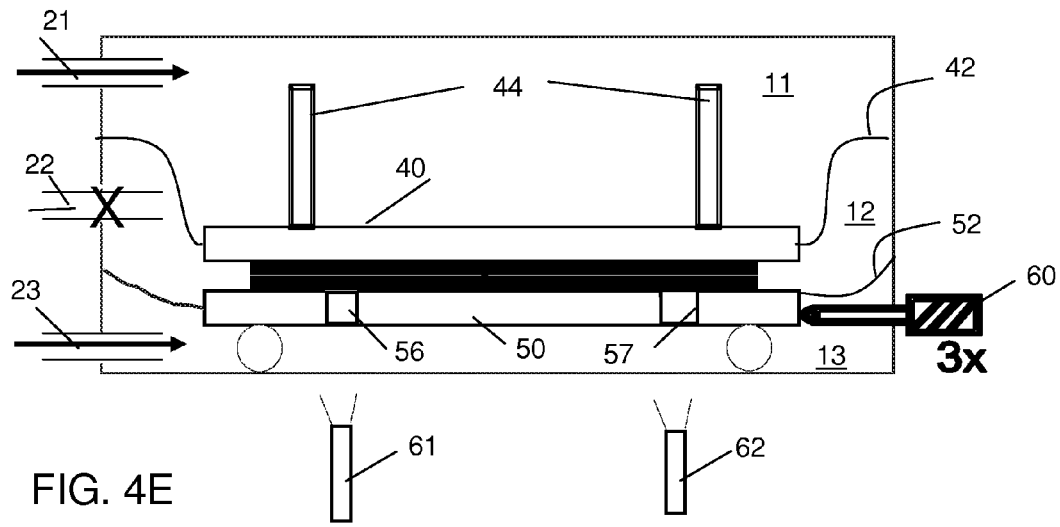

FIG. 4E shows a subsequent step, wherein the first and the third compartment 11, 13 are pressurized having as a result that the first sheet carrier 40 is pushed towards the second sheet carrier 50, therewith laminating the sheets 1 and 2. This is the second main operational mode of the device, wherein the ratio of the pressure in the first compartment 11 over the pressure in the second compartment 12 as well as the ratio of the pressure in the third compartment 13 over the pressure in the second compartment 12 are relatively high. The pressure applied in the first and the second compartment 11, 13 may be atmospheric pressure. In that case it suffices to open a valve to the ports 21 and 23. Alternatively a higher or a lower pressure may be applied with more sophisticated means. In an embodiment of the method according to the second aspect of the invention, the sheets 1,2 are aligned in the operational mode as described with reference to FIG. 4A and the mode shown in FIG. 4D is achieved by evacuating the second compartment 12 starting from that mode. However, in this case lamination may already occur before the evacuation of the second compartment 12 is fully completed. This may result in the presence of air inclusions between the sheets 1 and 2 in the laminated product. The intermediate mode as described with reference to FIG. 4D postpones the lamination process while the second compartment is already evacuated, so that more time is available for allowing air to escape from between the sheets 1, 2 before they are laminated. It is favorable if the alignment of the sheets takes place in this stage as the time spent for evacuation between the sheets is efficiently used to align the sheets.

Figure 4F:
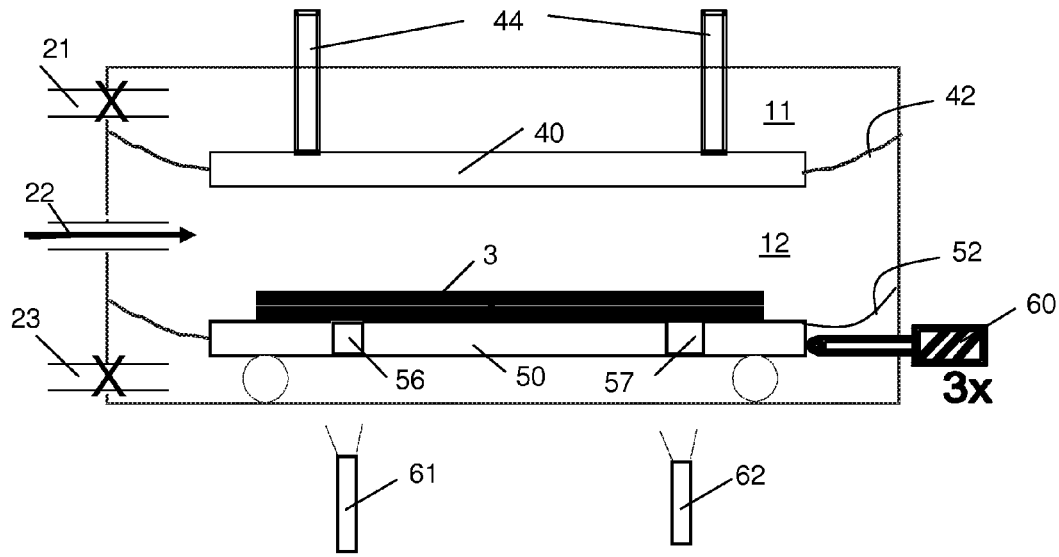

FIG. 4F shows a last step, wherein the second compartment 12 is pressurized again. Most practically atmospheric pressure is applied to the second compartment, so that there are no pressure differences at the moment that the apparatus is opened.

Figure 5:
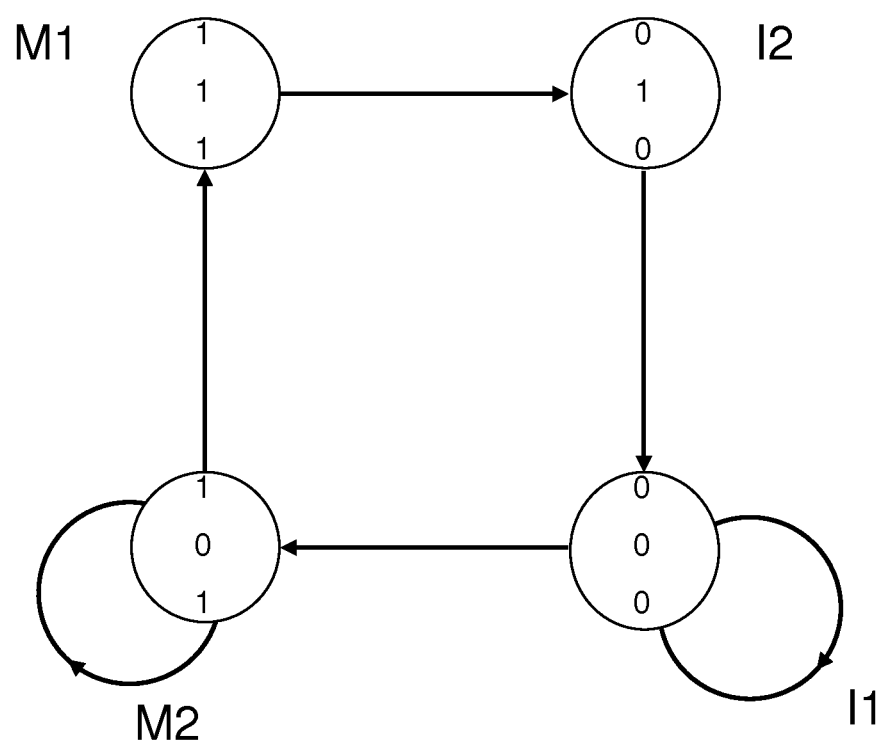
FIG. 5 shows subsequent modes of a controller for controlling the apparatus according to FIG. 1.

FIG. 5 schematically shows a mode diagram of the control facility 65. The control facility 65 has a first main operational mode M1 wherein it allows the ratio of the pressure inside the first compartment 11 over the pressure inside the second compartment 12 to be relatively low. In a practical implementation this implies that the controller 65 maintains valves between the ports 21, 22, 23 and the environment of the apparatus in an opened mode, so that each of the compartments assumes an atmospheric pressure.

From this main operational mode a transition takes place, indicated by the arrow from mode M1 to mode 12, wherein the controller 65 causes the pressure controllers 31, 32 to evacuate the first and the third compartment 11, 13. Therewith second intermediate mode 12 is assumed, wherein the first and the third compartment are evacuated and the second compartment is still at atmospheric pressure. After the second intermediate mode 12 is assumed the controller 65 causes the pressure controller 32 to evacuate also the second compartment 12. Therewith the first intermediate mode I1 is assumed wherein each of the compartments 11, 12, 13 is evacuated. In this first intermediate mode the controller 65 causes the alignment facility 60 to align the sheets 1,2 using the input data $S_1$, $S_2$ received from the visual detection facility 61, 62. After completion of the first intermediary mode I1, i.e. after the sheets 1,2 are aligned and air enclosed between the sheets is sufficiently removed, the controller 65 provides for a transition to the second main operational mode M2, indicated by the arrow from mode I1 to mode M2. To that end the controller 65 controls the pressure controllers 31, 33 to apply a pressure to the first and the third compartment 11, 13. In a practical implementation this may imply that the controller 65 controls a first and a second valve that couple the first and the third compartment to the external atmosphere, so that the first and the third compartment 11, 13 assume atmospheric pressure. Alternatively however a lower or a higher pressure may be applied by more sophisticated means. Mode M2 is maintained for some time until a sufficient lamination of the sheets 1, 2 is achieved, resulting in end product 3. Then the controller 65 provides for a transition to the main operation mode M1, indicated by the arrow from M2 to M1, by allowing air or another gas to access the second compartment 12, e.g. by opening a valve that coupled the second compartment 12 with the environment.

Figure 6A:
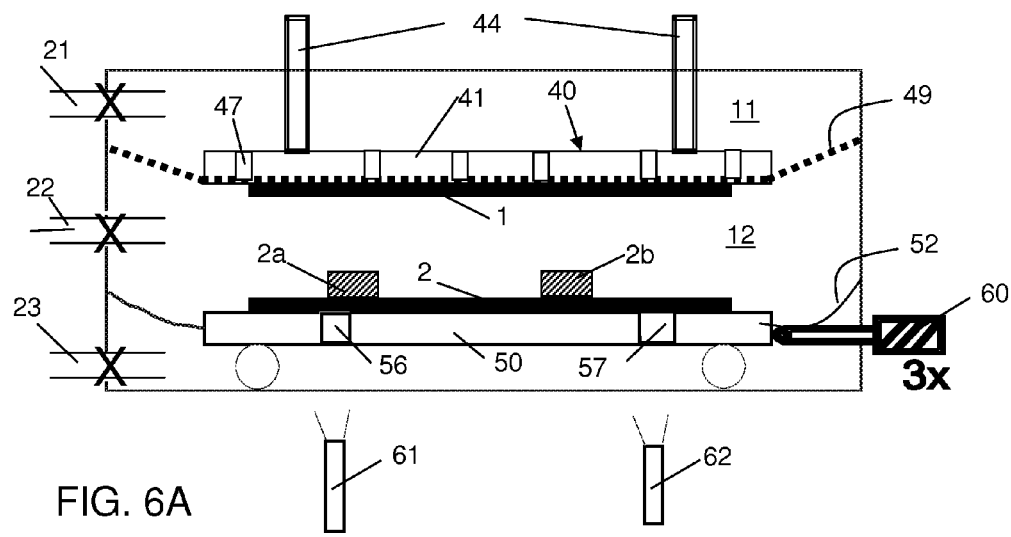
FIG. 6A shows a further embodiment of an apparatus according to the first aspect of the invention in a first operational state.
Figure 6B:
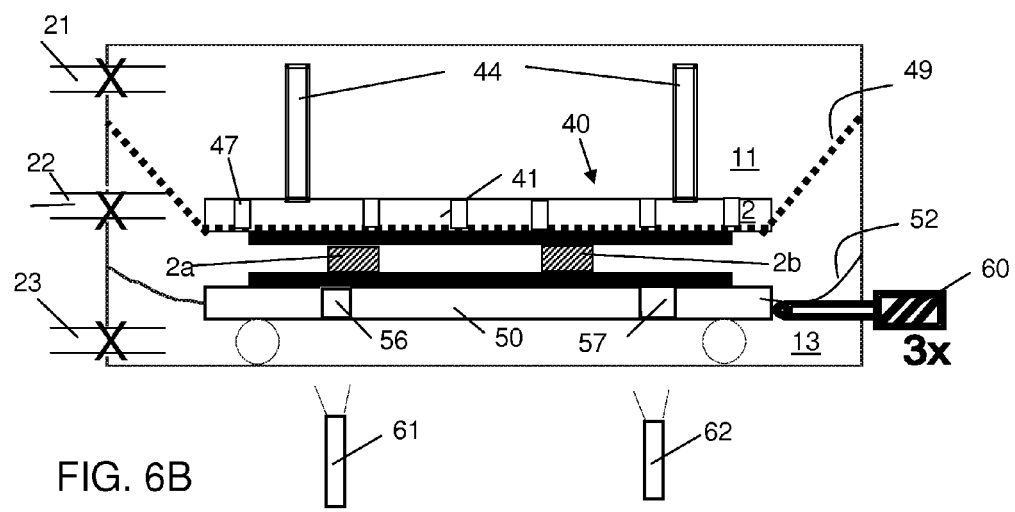
FIG. 6B shows the further embodiment of an apparatus according to the first aspect of the invention in a second operational state.
Figure 6C:
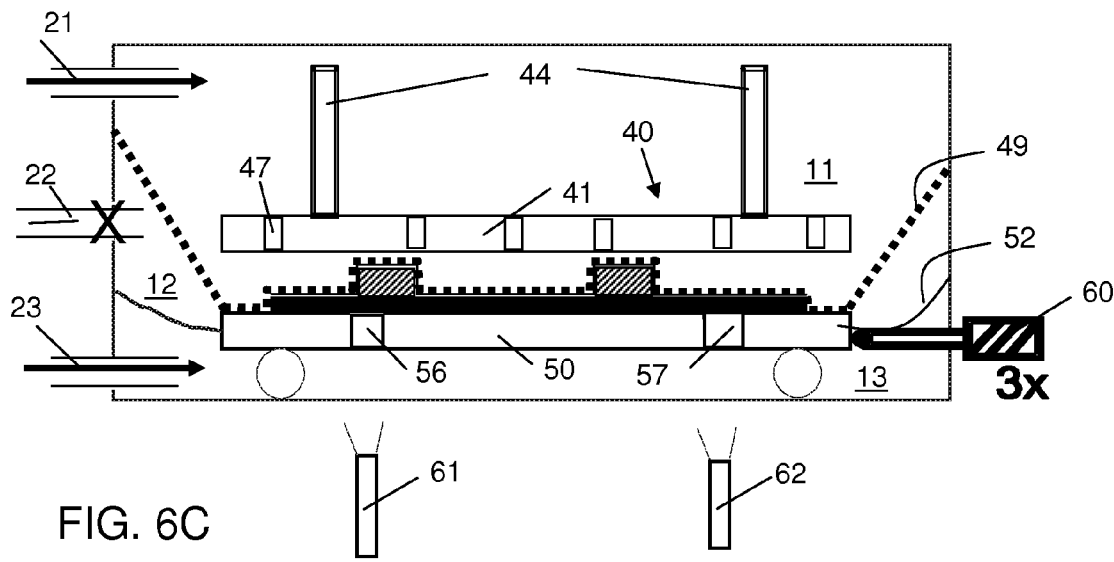
FIG. 6C shows the further embodiment of an apparatus according to the first aspect of the invention in a third operational state.

FIGS. 6A to 6C show a further embodiment of the apparatus according to the first aspect of the invention and its operation. This embodiment is in particular suitable for lamination of sheets having a non-flat surface, for example because they have parts 2a, 2b applied thereon.

In the apparatus shown in these Figures the first flexible membrane 49 forms part of the first sheet carrier 40.

More in particular the first sheet carrier 40 has a first rigid part 41 and a second flexible part 49 formed by said flexible membrane. The second flexible part 49 is arranged at a side of the first rigid part 41 facing the second sheet carrier 50.

To clearly indicate the second flexible part 49 it is drawn as a dotted shape. In practice however, the second flexible part 49 is made of an airtight material, such as a silicone rubber. The second flexible part 49 may be provided with a layer of a self-sticking material, such as PMDS to hold the first sheet 1.

It is further shown that the rigid part 41 of the first sheet carrier 40 has pores 47 that extend along the first axis Z.

FIG. 6A shows the further embodiment in its first intermediate operational mode I1, as described with reference to FIG. 5. Therein each of the compartments is in an evacuated state.

Starting from this state the rigid part 41 of the first sheet carrier 40 is moved towards the second sheet carrier 50 without exerting a pressure against the parts 2a, 2b of the second sheet 2, so that the apparatus assumes the state shown in FIG. 6B.

Starting from this state the first and the second compartment are aerated via their respective access ports 21, 23. This causes the second, flexible part 49 of the first sheet carrier 40 to press the first sheet 1 in a shape conformal with the second sheet 2 and the parts 2a, 2b thereon, as shown in FIG. 6C.

Figure 7:
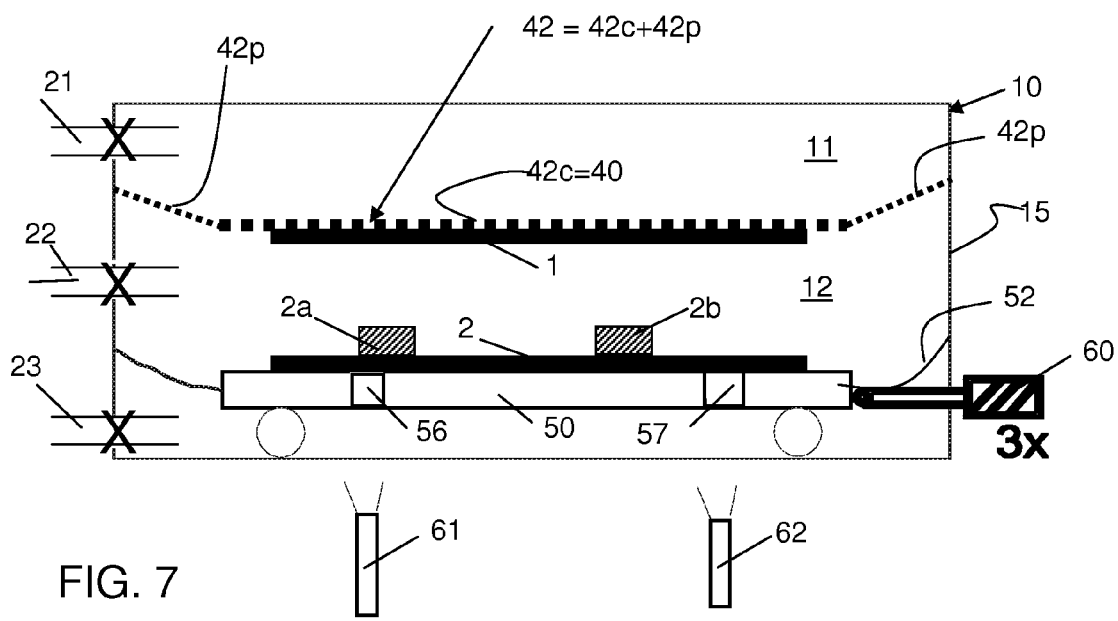
FIG. 7 shows a still further embodiment of an apparatus according to the first aspect of the invention.

In an other embodiment, shown in FIG. 7, the first flexible membrane 42 has a central portion 42c forming the first sheet carrier 40 and a peripheral portion 42p extending from the central portion 42c to the wall 15 of the chamber 10. The peripheral portion 42p has a flexibility higher than that of the central portion 42c. This may for example be realized in that the central portion 42c has a relatively high thickness as compared to the peripheral portion 42p.

In this way, even in the absence of a separate rigid part, when applying a pressure difference between the first and the second compartment 11, 12 the central portion 42c will initially remain substantially flat, while the peripheral portion 42p allows the central portion 42c to move along the Z-axis. Once the central portion 42c carrying the first sheet 1 has approached the second sheet 2 carried by the second sheet carrier 50, the pressure difference causes the central portion 42c to deform in a shape conformal with the second sheet 2 and the parts 2b thereon.

In again another embodiment the first flexible membrane is integral with the first sheet carrier. This embodiment differs from the embodiment shown in FIG. 6A to 6C in that the first sheet carrier lacks a rigid part 41. It is an advantage of the embodiment of FIGS. 6A to 6C that the rigid part 41 can clearly define the shape of the flexible part 49 during the alignment of the first and the second sheet 1,2. This provides for a more accurate alignment.

The control facility 65 may be implemented as dedicated hardware, as a suitably programmed general purpose processor or as a combination of both. In the claims the word "comprising" does not exclude other elements or steps, and the indefinite article "a" or "an" does not exclude a plurality. A single component or other unit may fulfill the functions of several items recited in the claims. The mere fact that certain measures are recited in mutually different claims does not indicate that a combination of these measures cannot be used to advantage. Any reference signs in the claims should not be construed as limiting the scope.

The invention claimed is:

1. Method for laminating a first and a second sheet comprising the steps of:
   providing a chamber with a first, a second and a third compartment, subsequently arranged along a first axis, a first and a second sheet carrier, and a first and second flexible membrane that extend laterally to a wall of the chamber, wherein the first flexible membrane or the first sheet carrier and the first flexible membrane separate the first and the second compartment of the chamber from each other, and wherein the second sheet carrier and the second flexible membrane separates the second and the third compartment of the chamber from each other, and wherein the sheet carriers are aligned with each other and are arranged transverse to the first axis;
   applying the first sheet at a side of the first sheet carrier facing the second sheet carrier;
   applying the second sheet at a side of the second sheet carrier facing the first sheet carrier;
   maintaining a ratio of a pressure inside the first compartment over a pressure inside the second compartment;
   detecting a relative position and/or orientation of the second sheet relative to the first sheet;
   aligning the second sheet relative to the first sheet by moving the second sheet carrier in a direction transverse to the first direction and/or rotating the second sheet carrier around an axis parallel to the first direction; and
   maintaining a second ratio of the pressure inside the first compartment over the pressure inside the second compartment and a ratio of a pressure inside the third compartment over a pressure inside the second compartment, wherein both the second and third ratios are greater than the first ratio.

2. Method for laminating according to claim 1, wherein the pressure inside the second compartment in the second ratio and in the third ratio is below 0.1 bar.

3. Method for laminating according to claim 2, comprising the additional step of evacuating all compartments.

4. Method for laminating according to claim 3, wherein the additional step comprises a first sub-step of evacuating the first and the third compartment and a second sub-step following the first sub-step of evacuating the second compartment.

5. Apparatus for laminating a first and a second sheet comprising:
   a chamber having a first, a second and a third compartment subsequently arranged along a first axis, each compartment having a port;
   a first sheet carrier arranged transverse to said first axis and being displaceable along said first axis;
   a second sheet carrier arranged in a plane aligned with and opposite the first sheet carrier, the second sheet carrier being displaceable and/or rotatable in said plane,
   a first flexible membrane extending laterally to a wall of the chamber; wherein the first flexible membrane or the first sheet carrier and the first flexible membrane separate the first and the second compartment of the chamber from each other;
   a second flexible membrane extending laterally from the second sheet carrier to the wall of the chamber, the second sheet carrier and the second flexible membrane separating the second and the third compartment of the chamber from each other;
   an alignment facility to align the second sheet relative to the first sheet by moving the second sheet carrier in a direction transverse to the first axis and/or rotating the second sheet carrier around an axis parallel to the first axis; and
   the apparatus having a first main operational mode wherein a ratio of a pressure inside the first compartment over a pressure inside the second compartment is a first ratio and a second main operational mode wherein the ratio of the pressure inside the first compartment over the pressure inside the second compartment is a second ratio and a ratio of a pressure inside the third compartment over a pressure inside the second compartment is a third ratio, wherein both the second and third ratios are greater than the first ratio.

6. Apparatus according to claim 5, wherein the first flexible membrane forms part of the first sheet carrier.

7. Apparatus according to claim 6, wherein the first flexible membrane is integral with the first sheet carrier.

8. Apparatus according to claim 6, wherein the first sheet carrier has a first rigid part and a second flexible part formed by said flexible membrane, the second flexible part being arranged at a side of the first rigid part facing the second sheet carrier.

9. Apparatus according to claim 7, wherein the first flexible membrane has a central portion forming the first sheet carrier and a peripheral portion extending from the central portion to the wall of the chamber, the peripheral portion having a flexibility higher than that of the central portion.

10. Apparatus according to claim 8, wherein the rigid part of the first sheet carrier has pores that extend along the first axis.

11. Apparatus according to claim 5, wherein the second compartment is in an evacuated state in the second main operational mode and wherein the apparatus has a first intermediary operational mode succeeding the first main operational mode and preceding the second main operational mode, wherein each of the compartments is in an evacuated state.

12. Apparatus according to claim 11, having a second intermediary operational mode succeeding the first main operational mode and preceding the first intermediary operational mode wherein the first and the third compartment are evacuated and the second compartment maintains the pressure of the first main operational mode.

13. Apparatus according to claim 11, wherein the alignment facility is activated in the first intermediary operational mode.

14. Apparatus according to claim 5, comprising a first and a second visual detection facility associated with a first and a second window, the first and the second window being arranged in at least one of the sheet carriers and wherein each of the visual detection facilities has a line of sight extending in a direction parallel with the first axis via its associated window in the sheet carrier wherein the window is arranged to the other one of the sheet carriers.

15. Apparatus according to claim 12, wherein the alignment facility is activated in the first intermediary operational mode.

* * * * *